(12) United States Patent
Kikuchi

(10) Patent No.: US 9,843,782 B2
(45) Date of Patent: Dec. 12, 2017

(54) INTERPOLATION DEVICE, STORAGE MEDIUM, AND METHOD WITH MULTI-BAND COLOR FILTER AND NOISE REDUCED REFERENCE IMAGE

(71) Applicant: OLYMPUS CORPORATION, Hachioji-shi, Tokyo (JP)

(72) Inventor: Sunao Kikuchi, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 19 days.

(21) Appl. No.: 15/187,405

(22) Filed: Jun. 20, 2016

(65) Prior Publication Data

US 2016/0309131 A1   Oct. 20, 2016

Related U.S. Application Data

(63) Continuation of application No. PCT/JP2014/077286, filed on Oct. 14, 2014.

(30) Foreign Application Priority Data

Dec. 24, 2013   (JP) ................ 2013-265472

(51) Int. Cl.
*H04N 9/64* (2006.01)
*H04N 9/04* (2006.01)
(Continued)

(52) U.S. Cl.
CPC .......... *H04N 9/646* (2013.01); *G06T 3/4015* (2013.01); *G06T 5/002* (2013.01); *G06T 5/50* (2013.01);
(Continued)

(58) Field of Classification Search
CPC ......... G06T 2207/10024; G06T 3/4015; G06T 5/002; G06T 5/50; H04N 9/646; H04N 9/045
See application file for complete search history.

(56) References Cited

U.S. PATENT DOCUMENTS 7,065,246 B2   6/2006   Xiaomang et al.
8,295,631 B2   10/2012   Adams et al.
(Continued)

FOREIGN PATENT DOCUMENTS

JP   2002077928 A   3/2002
JP   2009049482 A   3/2009
(Continued)

OTHER PUBLICATIONS

International Search Report (ISR) dated Jan. 20, 2015 issued in International Application No. PCT/JP2014/077286.
(Continued)

*Primary Examiner* — Kenny Cese
(74) *Attorney, Agent, or Firm* — Holtz, Holtz & Volek PC

(57) ABSTRACT

An image processing device includes a processor, and the processor acquires a captured image that has been captured using an image sensor, the image sensor including a multi-band color filter array in which color filters that respectively correspond to four or more bands are arranged in an array, generates a low-noise reference image subjected to a noise reduction process as a reference image that is used for an interpolation process that is performed on pixel values of the captured image, and performs the interpolation process on a band basis based on the generated low-noise reference image to generate an interpolated image in which pixel values of missing pixels are interpolated.

17 Claims, 16 Drawing Sheets

(51) Int. Cl.
G06T 5/00 (2006.01)
G06T 5/50 (2006.01)
G06T 3/40 (2006.01)

(52) U.S. Cl.
CPC ... *H04N 9/045* (2013.01); *G06T 2207/10024* (2013.01)

(56) References Cited

U.S. PATENT DOCUMENTS

| | | |
|---|---|---|
| 8,363,123 B2 | 1/2013 | Inaba et al. |
| 8,456,544 B2 | 6/2013 | Fukutomi et al. |
| 9,344,614 B2 | 5/2016 | Kikuchi |
| 2014/0072214 A1* | 3/2014 | Tanaka .................. H04N 9/04 382/165 |

FOREIGN PATENT DOCUMENTS

| | | | |
|---|---|---|---|
| JP | 2009153013 A | 7/2009 | |
| JP | 2012222704 A | 11/2012 | |
| JP | 2012239038 A | 12/2012 | |
| JP | 2013093754 A | 5/2013 | |
| JP | 2013529400 A | 7/2013 | |
| WO | 2011094029 A1 | 8/2011 | |

OTHER PUBLICATIONS

Japanese Office Action dated Mar. 17, 2015 issued in counterpart Japanese Application No. 2013-265472.

* cited by examiner

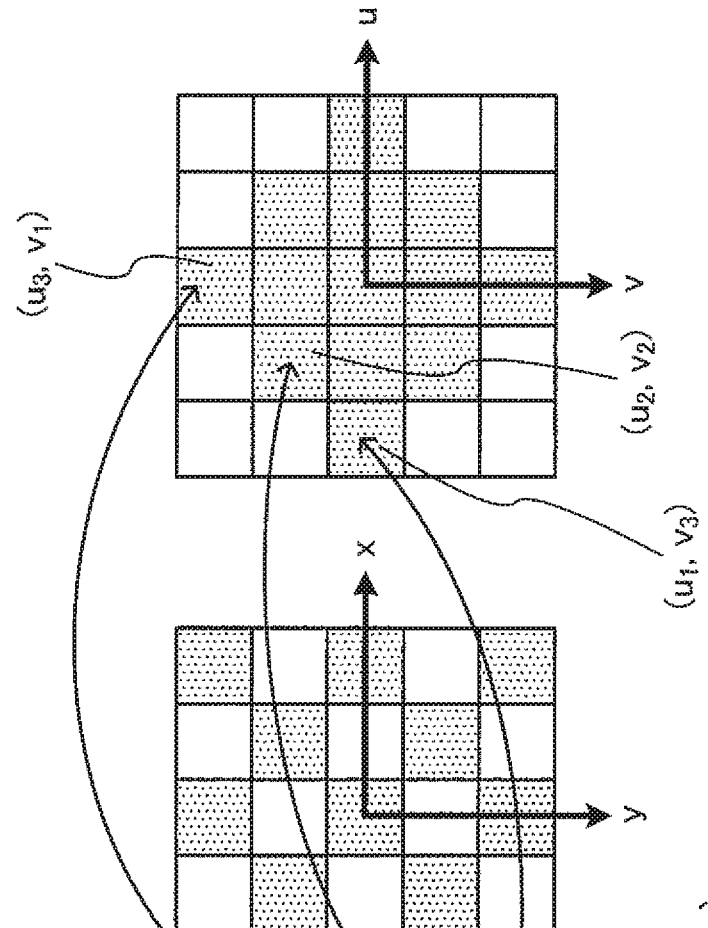
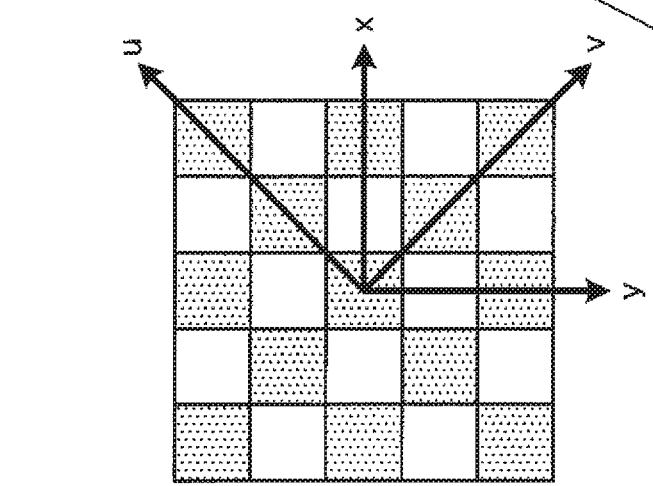

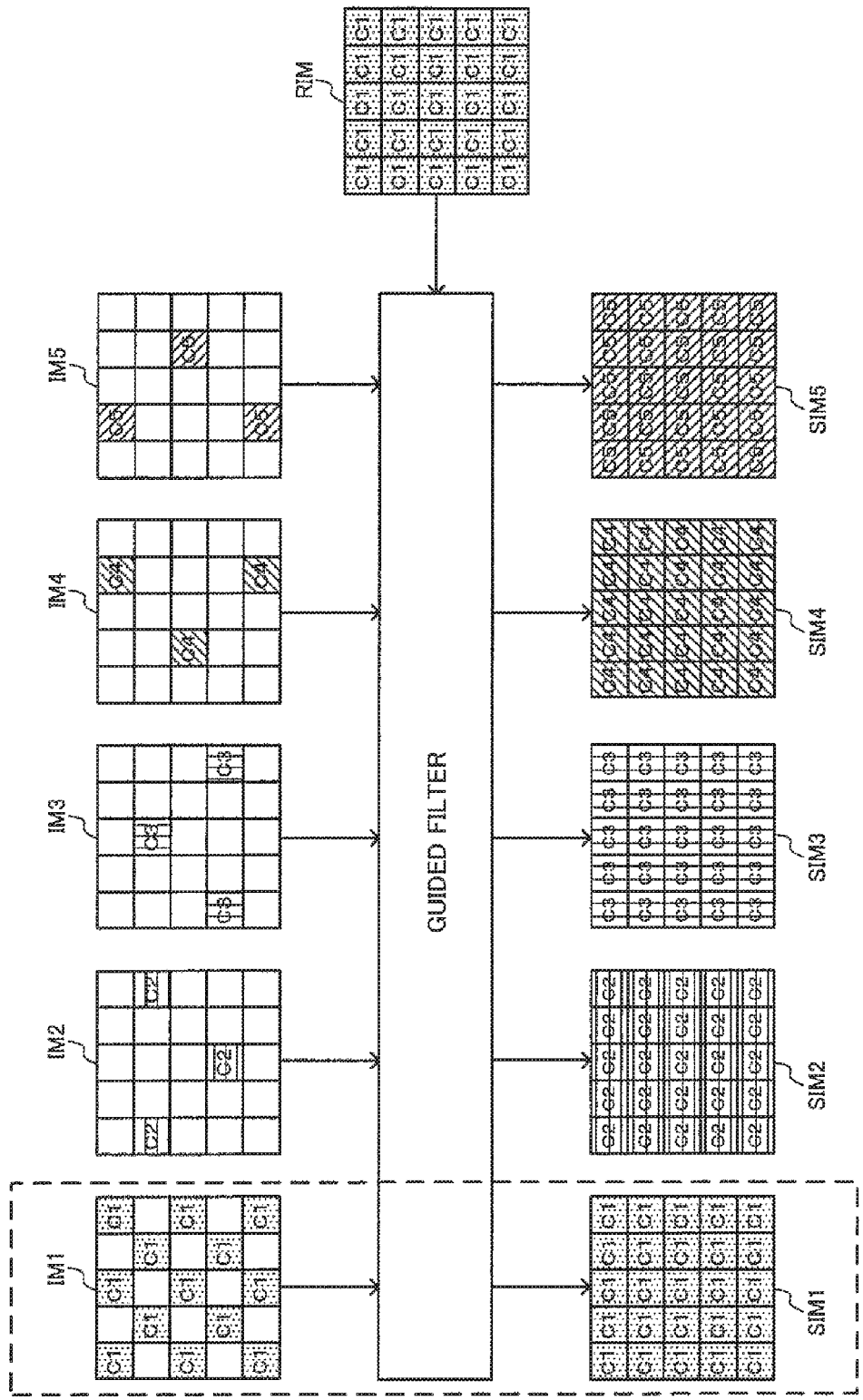

INTERPOLATION DEVICE, STORAGE MEDIUM, AND METHOD WITH MULTI-BAND COLOR FILTER AND NOISE REDUCED REFERENCE IMAGE

CROSS REFERENCE TO RELATED APPLICATION

This application is a continuation of International Patent Application No. PCT/JP2014/077286, having an international filing date of Oct. 14, 2014, which designated the United States, the entirety of which is incorporated herein by reference. Japanese Patent Application No. 2013-265472 filed on Dec. 24, 2013 is also incorporated herein by reference in its entirety.

BACKGROUND

The present invention relates to image processing device, an imaging device, an information storage medium, an image processing method, and the like.

An imaging device may be designed to include an image sensor that is provided with 3-band (red (R), green (G), and blue (B)) color filters in order to capture a full-color image.

In recent years, a multi-band imaging technique has attracted attention as a means that makes it possible to accurately reproduce the color of the object. A multi-band imaging device may be designed to utilize a single-chip multi-band image sensor that is provided with color filters that respectively correspond to four or more bands (see FIGS. 3A and 3B (described later)). It is possible to acquire a multi-band image by capturing only one image using such a multi-band image sensor. Therefore, it is possible to reduce the size of the device while maintaining the frame rate, for example.

An imaging device that includes such a multi-band image sensor generates a multi-band image from the captured image by performing an interpolation process. In this case, it is effective to generate an interpolated image using information about a band that allows accurate acquisition of a high-frequency component in order to generate an interpolated image that includes a large amount of high-frequency component and has high resolution (see JP-A-2012-239038).

When the multi-band image includes a large amount of noise, it is necessary to perform a noise reduction process in the same manner as in the case of generating an RGB image. JP-A-2012-239038 discloses a method that performs the noise reduction process on the multi-band image on a band basis. JP-A-2002-77928 discloses a method that converts a 4-band image into an RGB image (3-band image), and performs the noise reduction process on the RGB image in order to utilize a known RGB image noise reduction process.

SUMMARY

According to one aspect of the invention, there is provided an image processing device comprising:

a processor comprising hardware, the processor being configured to implement:

an image acquisition process that acquires a captured image that has been captured using an image sensor, the image sensor including a multi-band color filter array in which color filters that respectively correspond to four or more bands are arranged in an array;

a low-noise reference image generation process that generates a low-noise reference image as a reference image that is used for an interpolation process that is performed on pixel values of the captured image, the low-noise reference image having been subjected to a noise reduction process; and an interpolated image generation process that performs the interpolation process on a band basis based on the generated low-noise reference image to generate interpolated image in which pixel values of missing pixels are interpolated.

According to another aspect of the invention, there is provided an imaging device comprising the above image processing device.

According to another aspect of the invention, there is provided a computer-readable storage device with an executable program stored thereon, wherein the program instructs a microprocessor to perform the following steps of:

an image acquisition process that acquires a captured image that has been captured using an image sensor, the image sensor including a multi-band color filter array in which color filters that respectively correspond to four or more bands are arranged in an array;

a low-noise reference image generation process that generates a low-noise reference image as a reference image that is used for an interpolation process that is performed on pixel values of the captured image, the low-noise reference image having been subjected to a noise reduction process; and an interpolated image generation process that performs the interpolation process on a band basis based on the generated low-noise reference image to generate an interpolated image in which pixel values of missing pixels are interpolated.

According to another aspect of the invention, there is provided an image processing method comprising:

performing an image acquisition process that acquires a captured image that has been captured using an image sensor, the image sensor including a multi-band color filter array in which color filters that respectively correspond to four or more bands are arranged in an array;

performing a low-noise reference image generation process that generates a low-noise reference image as a reference image that is used for an interpolation process that is performed on pixel values of the captured image, the low-noise reference image having been subjected to a noise reduction process; and performing an interpolated image generation process that performs the interpolation process on a band basis based on the generated low-noise reference image to generate an interpolated image in which pixel values of missing pixels are interpolated.

BRIEF DESCRIPTION OF THE DRAWINGS

FIGS. 5A to 5C are views illustrating a coordinate transformation process and a noise reduction process.

FIG. 7 is a view illustrating a band-basis interpolation process.

DESCRIPTION OF EXEMPLARY EMBODIMENTS

Figure 1:
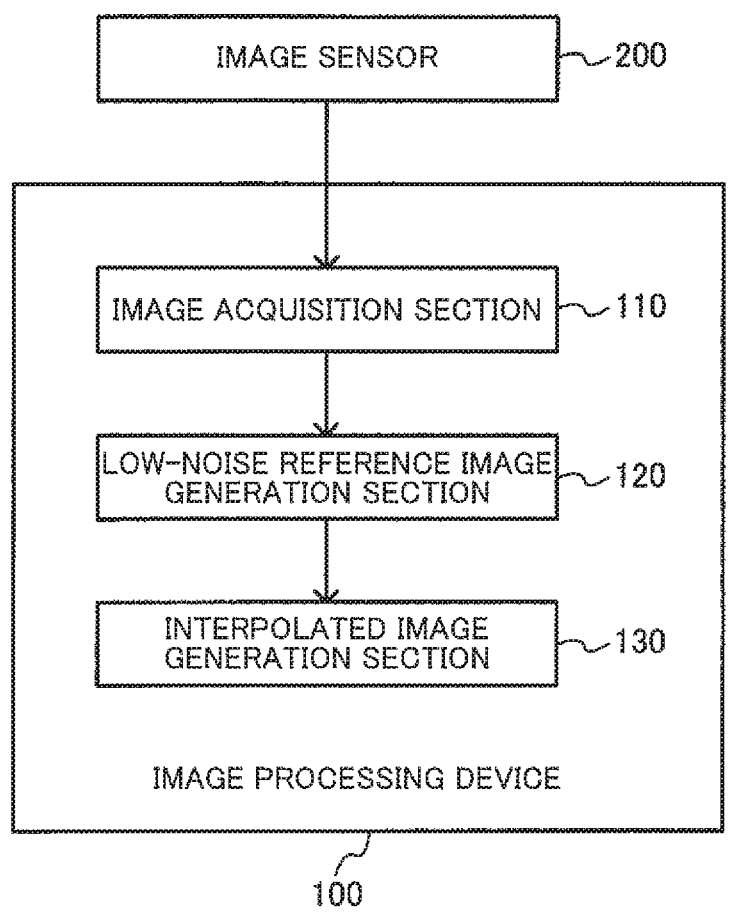
FIG. 1 illustrates a system configuration example (first embodiment).

Several aspects of the invention may provide an image processing device, an imaging device, an information storage medium, an image processing method, and the like that make it possible to generate a multi-band image that is reduced in noise from a captured image that has been acquired from a single-chip multi-band image sensor and includes noise while suppressing or reducing an increase in processing load due to a noise reduction process.

In the image processing device, wherein the processor may be configured to implement the low-noise reference image generation process that performs the noise reduction process on the pixel values of the captured image that have been obtained using the color filter that corresponds to a reference band that corresponds to the reference image to generate the low-noise reference image.

This makes it possible to suppress a situation in which the noise component spreads to the missing pixels due to the interpolation process, for example.

In the image processing device, wherein the processor may be configured to implement the interpolated image generation process that also calculates a new pixel value based on the low-noise reference image corresponding to pixels of the captured image that have the pixel value to generate the interpolated image.

This makes it possible to generate a smooth interpolated image (multi-band image) in which the difference in pixel value is relatively small between the pixels that originally have a pixel value and the pixels that have been provided with a pixel value through the interpolation process.

In the image processing device, wherein the processor may be configured to implement the low-noise reference image generation process that selects a first band among the four or more bands as a reference band that corresponds to the reference image, and performs the noise reduction process on the pixel values of the captured image that have been obtained using the color filter that corresponds to the first band to generate the low-noise reference image, and the processor may be configured to implement the interpolated image generation process that performs the interpolation process on the pixel values of the captured image that have been obtained using the color filter that corresponds to a second band among the four or more bands based on the low-noise reference image to generate the interpolated image that corresponds to the second band, and performs the interpolation process on the pixel values of the captured image that have been obtained using the color filter that corresponds to a third band among the four or more bands based on the interpolated image that corresponds to the second band to generate the interpolated image that corresponds to the third band.

This makes it possible to switch the reference image corresponding to the spectral sensitivity characteristics, for example.

In the image processing device, wherein the processor may be configured to implement the low-noise reference image generation process that performs a coordinate transformation process that transforms pixel coordinates from a first coordinate system to a second coordinate system on each pixel of the captured image that has been obtained using the color filter that corresponds to the reference band that corresponds to the reference image, performs the noise reduction process on the pixel value of each pixel that corresponds to the reference band that has been subjected to the coordinate transformation process, and performs a coordinate transformation process that transforms the pixel coordinates from the second coordinate system to the first coordinate system n each pixel that has been subjected to the noise reduction process to generate the low-noise reference image.

This makes it possible to perform the noise reduction process in a state in which the interpolation process has not been performed on the pixels that correspond to the reference band, for example.

In the image processing device, wherein the processor may be configured to implement the low-noise reference image generation process that performs a coordinate transformation process that rotates the pixel coordinates around an origin by a given angle as the coordinate transformation process that transforms the pixel coordinates from the first coordinate system to the second coordinate system.

This makes it possible to obtain a color filter array (image) in which the pixels having a pixel value that corresponds to the reference band adjoin each other, for example.

In the image processing device, wherein the processor may be configured to implement the low-noise reference image generation process that selects a band among the four or more bands that has a highest sampling density as a reference band that corresponds to the reference image.

This makes it possible to generate a reference image that includes the largest amount of high-frequency component and has high resolution, for example.

In the image processing device, wherein the processor may be configured to implement the low-noise reference image generation process that selects a band among the four or more bands that has a highest correlation with color characteristics of an object captured within the captured image as a reference band that corresponds to the reference image.

This makes it possible to generate an interpolated image that includes a large amount of high-frequency component and has high resolution regardless of the color characteristics of the object, for example.

In the image processing device, wherein the processor may be configured to implement the low-noise reference image generation process that selects a reference band that corresponds to the reference image from the four or more bands by performing an evaluation process on the captured image as to at least one of a correlation between each band among the four or more bands and color characteristics of an object captured within the captured image, and an amount of noise that corresponds to each band.

This makes it possible to generate an interpolated image that includes a large amount of high-frequency component and has high resolution even in a scene in which the amount of noise that corresponds to a specific band increases due to the light source used to capture the object, for example.

In the image processing device, wherein the processor may be configured to implement the low-noise reference image generation process that selects a reference band that corresponds to the reference image from the four or more bands by performing an evaluation process on the captured image as to at least one of a high-frequency component and brightness.

This makes it possible to accurately select a band that has a high correlation with the color characteristics of the object, for example.

In the image processing device, wherein the processor may be configured to implement the low-noise reference image generation process that performs the interpolation process on the pixel values of the captured image that have been obtained using the color filter that corresponds to a reference band that corresponds to the reference image, and performs the noise reduction process on the pixel values that correspond to the reference band and have been subjected to the interpolation process to generate the low-noise reference image.

This makes it possible to reduce the amount of noise using a more convenient process, for example.

In the image processing device, wherein the processor may be configured to implement a band conversion process that converts the pixel values that correspond to at least one band among the four or more bands into the pixel values that correspond to another band that differs in wavelength band from the at least one band, and the processor may be configured to implement the low-noise reference image generation process that selects a band that is used as a reference band that corresponds to the reference image from the bands obtained through the band conversion process, and performs the noise reduction process on the pixel values that correspond to the reference band obtained through the band conversion process to generate the low-noise reference image.

This makes it possible to utilize the pixel values that correspond to a band that cannot be acquired directly from the image sensor as the pixel values that correspond to the reference band, for example.

In the image processing device, wherein the processor may be configured to implement the band conversion process that is performed based on the captured image to generate an RGB image, and the processor may be configured to implement the low-noise reference image generation process that performs an RGB image noise reduction process as the noise reduction process.

This makes it possible to highly accurately reduce noise using the RGB image noise reduction process, for example.

In the image processing device, wherein the processor may be configured to implement a signal conversion process that converts each pixel value of the captured image into a brightness signal and a color difference signal, and the processor may be configured to implement the low-noise reference image generation process that performs a different noise reduction process on the brightness signal and the color difference signal as the noise reduction process to generate the low-noise reference image.

This makes it possible to highly accurately reduce noise using the Y image (brightness image)-CbCr image (color difference image) noise reduction process, for example.

Exemplary embodiments of the invention are described below. Note that the exemplary embodiments described below do not in any way limit the scope of the invention laid out in the claims. Note also that all of the elements described below in connection with the exemplary embodiments should not necessarily be taken as essential elements of the invention.

1. Outline

Several embodiments of the invention are characterized in that a noise reduction process is performed on the pixel values that correspond to a reference band to generate a low-noise reference image before generating an interpolated image that corresponds to each band (i.e., when generating a reference image), and an interpolation process is performed on the pixel values that correspond to each band other than the reference band based on the low-noise reference image that is reduced in noise.

This makes it possible to reduce the number of times in which the noise reduction process is performed when generating a multi-band image. It is also possible to suppress a situation in which noise included in the original captured image spreads to (diffuses into) the peripheral pixels due to the interpolation process.

FIG. 1 illustrates a configuration example of an image processing device 100 according to the embodiments of the invention, and an imaging device 300 that includes the image processing device 100. The image processing device 100 includes an image acquisition section 110, a low-noise reference image generation section 120, and an interpolated image generation section 130. In the image processing device 100, the image acquisition section 110 is connected to the low-noise reference image generation section 120, and the low-noise reference image generation section 120 is connected to the interpolated image generation section 130. The imaging device 300 includes the image processing device 100 and an image sensor 200. Note that the configuration of the image processing device 100 and the imaging device 300 that includes the image processing device 100 is not limited to the configuration illustrated in FIG. 1. Various modifications may be made, such as omitting some of the elements illustrated in FIG. 1, or providing an additional element.

The process performed by each section is described below. The image acquisition section 110 acquires a captured image that has been captured using the image sensor 200 that includes a multi-band color filter array in which color filters that respectively correspond to four or ore bands are arranged in an array. For example, the image acquisition section 110 acquires a captured image that has been captured using the image sensor 200 that includes a 5-band (C1 to C5) color filter array CFA1 illustrated in FIG. 3A (described later). Note that the term "multi-band" used herein refers to four or more bands.

The term "captured image" used herein refers to an image acquired from the image sensor 200. For example, the captured image is a RAW image (unprocessed image). The captured image includes information about the pixel value and additional information that represents the captured image. For example, the captured image may be signal data that is converted into the pixel value of the captured image. The captured image may be an image that has been subjected to image processing.

The low-noise reference image generation section 120 generates a low-noise reference image as a reference image that is used for an interpolation process that is performed on the pixel values of the captured image, the low-noise reference image having been subjected to a noise reduction process.

The term "reference image" used herein refers to an image that is referred to when the interpolation process is performed on the pixel values of the captured image. For example, the reference image is an image in which a pixel value that corresponds to a reference band has been calculated corresponding to each pixel (i.e., each pixel has a pixel value that corresponds to the reference band). The term "reference band" used herein refers to a band that is used to generate the reference image. In other words, the reference band is a band of the color filter that corresponds to the pixel value of each pixel that forms the reference image. The reference band setting (selection) method is described in detail later.

The term "low-noise reference image" used herein refers to the reference image that has been subjected to the noise reduction process. The low-noise reference image may be an image generated by subjecting the reference image that has been subjected to the noise reduction process to the interpolation process, or may be an image generated by subjecting the reference image that has been subjected to the interpolation process to the noise reduction process (described later).

For example, an image IM1 illustrated in FIG. 6A (described later) is extracted from the captured image. The image IM1 is an image that includes only pixels that have a pixel value among the pixel values of the captured image acquired by the image acquisition section 110 that is obtained using a color filter that corresponds to a C1 band illustrated in FIG. 3A (described later). The image IM1 is subjected to the noise reduction process and the interpolation process (on the pixel values that correspond to the C1 band) to generate a low-noise reference image RIM illustrated in FIG. 6B (described later). The details of the noise reduction process and the interpolation process are described later.

The interpolated image generation section 130 performs an interpolation process on a band basis based on the generated low-noise reference image to generate an interpolated image in which the pixel values of the missing pixels are interpolated. For example, the interpolated image generation section 130 performs the interpolation process on a band (C2 to C5) basis using the low-noise reference image RIM to generate an interpolated image (SIM2 to SIM5) that corresponds to each band (see FIG. 7) (described later). Note that the function of the low-noise reference image generation section 120 and the function of the interpolated image generation section 130 may be implemented by hardware such as a processor (e.g., CPU) or an ASIC (e.g., gate array), a program, or the like. Part or the entirety of the functions of the image processing device and the imaging device according to the embodiments of the invention may be implemented by a server that is connected to the image processing device or the imaging device through a communication channel.

The term "interpolated image" used herein refers to an image in which only the pixel value of one band among a plurality of bands that respectively correspond to the color filters included in the color filter array has been calculated corresponding to each pixel. For example, an image SIM2 illustrated in FIG. 7 is a C2-band interpolated image, and an image SIM3 illustrated in FIG. 7 is a C3-band interpolated image.

It is possible to generate an interpolated image that is reduced in noise without performing the noise reduction process on a band basis by utilizing the low-noise reference image that has been subjected to the noise reduction process. A multi-band image that is reduced in noise can be acquired by synthesizing the generated interpolated images.

This makes it possible to generate a multi-band image that is reduced in noise from the captured image that has been acquired from a single-chip multi-band image sensor and includes noise while suppressing or reducing an increase in processing load due to the noise reduction process.

According to the invention disclosed in JP-A-2012-239038 (comparative example), the noise reduction process is performed on a band basis. Therefore, it is necessary to perform the noise reduction process five times when an image sensor that includes 5-band color filters illustrated in FIG. 3A (described later) is used, for example. According to the embodiments of the invention, it suffices to perform the noise reduction process only once on the pixel value that corresponds to the reference band. This makes it possible to reduce the processing time, for example. Since the interpolation process is performed using the reference image that is reduced in noise, it is possible to implement a highly accurate interpolation process.

According to the invention disclosed in JP-A-2002-77928 (comparative example), it is impossible to acquire a multi-band image that is reduced in noise. According to the embodiments of the invention, it is possible to acquire a multi-band image that is reduced in noise while improving color reproducibility using multi-band color filters. Therefore, the embodiments of the invention have superiority over the comparative examples when the observation target cannot be observed without using a multi-band image, for example.

2. First Embodiment

Figure 2:
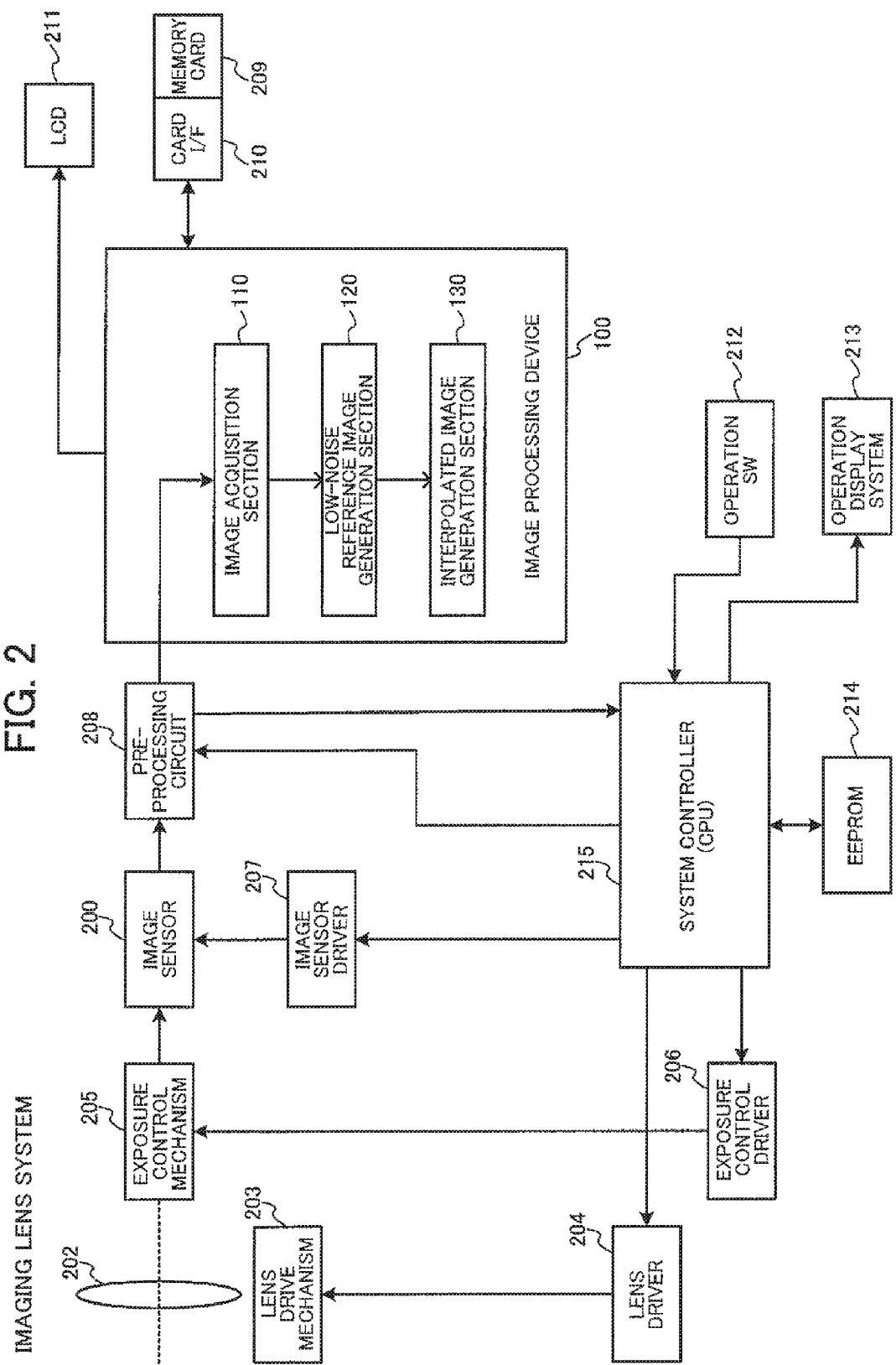
FIG. 2 illustrates a system configuration example of an imaging device (first embodiment).

A first embodiment of the invention is described below. FIG. 2 illustrates a detailed system configuration example of the imaging device 300 that includes the image processing device 100 according to the first embodiment.

The imaging device 300 illustrated in FIG. 2 includes an imaging lens system 202 that includes various lenses (imaging lenses), a lens drive mechanism 203 that drives the imaging lens system 202 forward and backward, and drives a zoom lens and a focus lens included in the imaging lens system 202, a lens driver 204 that controls the lens drive mechanism 203, an exposure control mechanism 205 that controls the aperture (and the shutter) of the imaging lens system 202, an exposure control driver 206 that controls the exposure control mechanism 205, the image sensor 200 that photoelectrically converts an object image, and includes four or more color filters that differ in spectral sensitivity characteristics, an image sensor driver 207 that drives the image sensor 200, a preprocessing circuit 208 that includes an analog amplifier, an A/D converter, and the like, the image processing device 100, a card interface (card I/F) 210 that functions as an interface with a memory card 209 (external recording medium), an LCD image display system 211, an operation switch system 212 that includes a shutter release switch, a setting button, and the like, an operation display system 213 that displays an operation state, a mode state, and the like, a nonvolatile memory (EEPROM) 214 in which setting information and the like are set (stored), and a system controller (CPU) 215 that controls each section.

The system controller 215 controls the entire imaging device 300. Specifically, the system controller 215 controls (drives) the image sensor 200 using the lens driver 204, the exposure control driver 206, and the image sensor driver 207 to implement exposure (charge storage) and a signal readout process. The system controller 215 performs an A/D conversion process on the read signal through the preprocessing circuit 208, transmits the resulting signal to the image processing device 100, causes each section of the image processing device 100 to perform signal processing, and records the resulting signal in the memory card 209 through the card interface 210.

Figure 3A:
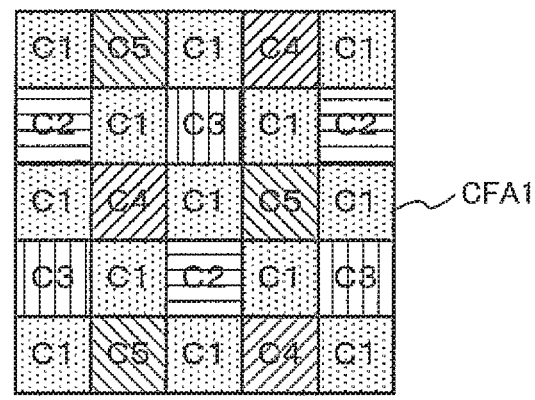
FIGS. 3A and 3B illustrate an example of a color filter array.
Figure 3B:
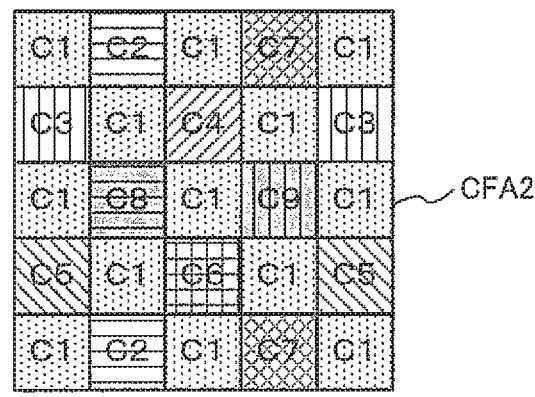

FIGS. 3A and 3B illustrate an example of a color filter array that has spectral sensitivity characteristics that correspond to four or more bands. The color filter array represents the arrangement of the color filters that are provided to the pixels of the image sensor 200. FIG. 3A illustrates an example of a color filter array CFA1 that has 5-band spectral sensitivity characteristics. In the color filter array CFA1, a C1 band is higher in sampling density than the other bands, and C1-band color filters are provided in a staggered pattern in the same manner as the G-band color filters included in a 3-band Bayer array. Note that the color filter array used in connection with the first embodiment is not limited to a 5-band color filter array as illustrated in FIG. 3A. For example, it is possible to implement a similar process using a 9-band color filter array CFA2 as illustrated in FIG. 3B.

In the first embodiment, the low-noise reference image generation section 120 selects a band among the four or more bands that has the highest sampling density as the reference band that corresponds to the reference image in principle. Specifically, when using the color filter array illustrated in FIG. 3A or 3B, the C1 band is used as the reference band.

This makes it possible to generate a high-resolution reference image that includes the largest amount of high-frequency component, and improve the interpolation accuracy corresponding to each band, for example. Note that a band other than the C1 band may be used as the reference band (as described later).

The details of various types of signal processing performed by the image processing device 100 are described below using a flowchart illustrated in FIG. 4.

The image sensor 200 captures an image (S101), and the image acquisition section 110 reads RAW data from the image sensor 200 (S102). Note that the term "RAW data" used herein refers to data that represents a RAW image (captured image). The signal output from the image sensor 200 is subjected to the A/D conversion process by the preprocessing circuit 208, and then subjected to various types of signal processing such as a black level correction process and a white balance correction process. The data that has been subjected to various types of signal processing is referred to as "RAW data".

The low-noise reference image generation section 120 sets the C1 band to be the reference band (or extracts the pixels that correspond to the C1 band from the RAW data as the pixels that correspond to the reference band) (S103), and performs the noise reduction process on the pixel values that correspond to the C1 band (S104). For example, the noise reduction process is performed using a coring process, a median filtering process, or the like.

The low-noise reference image generation section 120 performs the interpolation process on the pixels that correspond to the C1 band and have been reduced in noise to generate the reference image that is formed by the pixels that correspond to the C1 band (S105). Note that the interpolation process is performed using a Gaussian interpolation method (described in detail later) or the like.

The interpolated image generation section 130 performs the interpolation process on a band (C2 to C5) basis using the reference image generated in the step S105 (S106), and the process is terminated.

As described above, the low-noise reference image generation section 120 performs the noise reduction process on the pixel values of the captured image that have been obtained using the color filter that corresponds to the reference band that corresponds to the reference image to generate the low-noise reference image. The low-noise reference image generation section 120 performs the interpolation process on the pixel values of the captured image that correspond to the reference band after performing the noise reduction process to generate the low-noise reference image. Specifically, the noise reduction process is performed on the pixel values that correspond to the reference band in a state in which the interpolation process has not been performed on the pixel values that correspond to the reference band.

This makes it possible to suppress a situation in which the noise component spreads to the missing pixels due to the interpolation process, for example.

Each step is described in detail below. The noise reduction process (step S104) that is performed on the pixels that correspond to the reference band is described below with reference to FIGS. 5A to 5C.

FIG. 5A illustrates the arrangement of the pixels that correspond to the C1 band that is set to be the reference band in the color filter array CFA1 illustrated in FIG. 3A. As illustrated in FIG. 5A, the pixels that correspond to the C1 band are arranged in a staggered pattern. It is very difficult to perform the noise reduction process in this state.

Therefore, the low-noise reference image generation section 120 performs a coordinate transformation process that transforms the pixel coordinates from a first coordinate system to a second coordinate system on each pixel of the captured image that has been obtained using the color filter that corresponds to the reference band that corresponds to the reference image. For example, the low-noise reference image generation section 120 transforms the pixel coordinates using the following expression (1) so that the pixels arranged using an xy-coordinate system (see FIG. 5B) are arranged using a uv-coordinate system (see FIG. 5C). In the example illustrated in FIGS. 5A to 5C, the first coordinate system is the xy-coordinate system, and the second coordinate system is the uv-coordinate system.

$$\begin{pmatrix} u \\ v \end{pmatrix} = \begin{pmatrix} \cos 45° & -\sin 45° \\ \sin 45° & \cos 45° \end{pmatrix} \begin{pmatrix} x \\ y \end{pmatrix} \quad (1)$$

For example, the pixel placed at the pixel coordinates $(x_1, y_1)$ is placed at the pixel coordinates $(u_3, v_1)$, the pixel placed at the pixel coordinates $(x_1, y_3)$ is placed at the pixel coordinates $(u_2, v_2)$, and the pixel placed at the pixel coordinates $(x_1, y_5)$ is placed at the pixel coordinates $(u_1, v_3)$ as a result of the coordinate transformation process.

The low-noise reference image generation section 120 performs the noise reduction process on the pixel value of each pixel that corresponds to the reference band that has been subjected to the coordinate transformation process. For example, the low-noise reference image generation section 120 performs a coring process or a median filtering process as the noise reduction process on the pixel values in the uv-coordinate system.

The low-noise reference image generation section 120 then performs a coordinate transformation process that transforms the pixel coordinates from the second coordinate system to the first coordinate system on each pixel that has been subjected to the noise reduction process. Specifically, the pixel coordinates of the pixels that have been subjected to the noise reduction process are transformed from the pixel coordinates in the uv-coordinate system into the pixel coordinates in the xy-coordinate system.

The low-noise reference image generation section 120 then performs the interpolation process on the pixel values that correspond to the reference band to generate the low-noise reference image (described in detail later).

This makes it possible to perform the noise reduction process in a state in which the interpolation process has not been performed on the pixels that correspond to the reference band, for example. Therefore, it is possible to suppress a situation in which the noise component spreads to the peripheral (missing) pixels due to the interpolation process, for example.

More specifically, the low-noise reference image generation section 120 performs a coordinate transformation process that rotates the pixel coordinates around the origin by a given angle as the coordinate transformation process that transforms the pixel coordinates from the first coordinate system to the second coordinate system.

In the example illustrated in FIGS. 5B and 5C, the pixel coordinates in the xy-coordinate system are transformed into the pixel coordinates in the uv-coordinate system by rotating the pixel coordinates by 45°.

This makes it possible to obtain a color filter array (image) in which the pixels having a pixel value that corresponds to the reference band adjoin each other, for example.

The interpolation process (step S105) that is performed on the pixels that correspond to the reference band (reference image generation process) is described below.

In the first embodiment, the reference image generation process is performed using a Gaussian interpolation (GI) method. The GI method estimates the pixel value of the missing pixel using the weighted average of local information around the pixel position at which the pixel value is estimated. The estimated pixel value $S^{GI}(x_p)$ with respect to the pixel position $x_p$ is given by the following expression (2).

$$S^{GI}(x_p) = \frac{1}{\varpi^{GI}(x_p)} \sum_{x_i \in N_{xp}} k(x_i - x_p) M(x_i) S(x_i) \quad (2)$$

Note that $N_{xp}$ is a set (pixel position set) of the pixel positions of the pixels situated around the pixel position $x_p$, $x_i$ is an arbitrary pixel position within the pixel position set $N_{xp}$, $S(x_i)$ is the pixel value at the pixel position $x_i$, $M(x_i)$ is a binary mask at the pixel position $x_i$, $k(x_i-x_p)$ is a weight based on the distance from the pixel position $x_p$, and $\varpi^{GI}(x_p)$ is a normalization coefficient (weight sum). The binary mask $M(x_i)$ is 1 at a position at which the pixel value is present, and is 0 at a position at which the pixel value is absent.

Figures 6A, 6B:
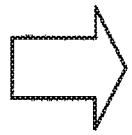
FIGS. 6A and 6B are views illustrating a reference-band interpolation process.

For example, the interpolation process is performed on the captured image IM1 illustrated in FIG. 6A to generate the reference image RIM in which the pixel value that corresponds to the C1 band is provided at each pixel position (see FIG. 6B).

The interpolation process (step S106) that is performed on a band basis is described below.

In the first embodiment, the interpolation process that utilizes the reference image is performed on the uninterpolated image using a guided filter (guided image filter) to generate an output image. It is considered that the output image obtained using the guided filter is represented by the linear transformation of the reference image. Coefficients $a_k$ and $b_k$ are calculated using the least-square method so as to minimize a cost function $E(a_k, b_k)$ of a local area k situated around the pixel position at which the pixel value is estimated (see the following expression (3)).

$$E(a_k, b_k) = \frac{1}{\varpi_k} \sum_i M_i \{(a_k I_i + b_k - p_i)^2 + \varepsilon a_k^2\} \quad (3)$$

Note that i is the pixel number, k is the local area number, $I_i$ is the pixel value of the pixel i included in the reference image, $p_i$ is the pixel value (signal component) of the pixel i included in the image that has not been subjected to the interpolation process, $\omega_k$ is the number of pixels that are included within the local area k of the image that has not been subjected to the interpolation process and have a signal component, $\epsilon$ is a given smoothing parameter, and $M_i$ is a binary mask that corresponds to the pixel i. The binary mask $M_i$ is set to 1 corresponding to a pixel that is included in the image that has not been subjected to the interpolation process and has a signal component, and is set to 0 corresponding to a pixel that is included in the image that has not been subjected to the interpolation process and does riot have a signal component. $a_k$ and $b_k$ are coefficient parameters that must be calculated for use in the following expression (4). An appropriate initial value is used as the coefficient parameters $a_k$ and $b_k$ when starting the calculations.

When the coefficients $a_k$ and $b_k$ have been calculated corresponding to each local area, the output pixel value $q_i$ is calculated using the expression (4) corresponding to each interpolation target pixel. In the first embodiment, the interpolation process is also performed on the pixels that originally have a signal component (pixel value) in addition to the pixels that do not have a signal component. Note that $|\omega|$ in the expression (4) is the total number of pixels within the local area (i.e., the number of local areas).

$$q_i = \frac{1}{|\omega|} \sum_{k: i \in \omega_k} (a_k I_i + b_k) \quad (4)$$

As illustrated in FIG. 7, the interpolation process that utilizes the reference image RIM obtained in the step S105 is performed on the uninterpolated image (IM2 to IM5) that corresponds to a band (C2 to C5) that differs from the C1 band (reference band) on a band basis. It is possible to generate the interpolated image (SIM2 to SIM5) that includes the high-frequency component of the reference image RIM while reducing noise by performing the interpolation process that utilizes the reference image RIM. Note that the interpolation process may also be performed on the uninterpolated image IM1 that corresponds to the C1 band in the step S106 to output the interpolated image SIM1. In this case, however, the interpolated image SIM1 is the same as the reference image RIM generated in the step S105. Therefore, it is desirable to use the reference image RIM as the interpolated image SIM1 in the subsequent process in order to reduce the amount of processing.

A new pixel value may not be calculated in the step S106 corresponding to the pixels of the captured image that originally have a pixel value. In this case, however, the difference in pixel value may increase between the pixels that originally have a pixel value and the pixels that have been provided with a pixel value through the interpolation process, and an interpolated image may be generated as if noise remained (i.e., an uneven interpolated image may be obtained).

Therefore, the interpolated image generation section 130 also calculates a new pixel value based on the low-noise reference image corresponding to the pixels of the captured image that have a pixel value to generate the interpolated image.

This makes it possible to generate a smooth interpolated image (multi-band image) in which the difference in pixel value is relatively small between the pixels that originally have a pixel value and the pixels that have been provided with a pixel value through the interpolation process.

An interpolated image that is reduced in noise can be output by thus utilizing the low-noise reference image that is reduced in noise. This feature is described below with reference to FIG. 8. As described above, the output image obtained using the guided filter is output as the linear transformation of the reference image. For example, a reference image RIM1 illustrated in FIG. 8 includes two flat areas (AR1 and AR2) defined by the thick line. The flat area AR1 is an area that is filled with a first color, and the flat area AR2 is an area that is filled with a second color that differs from the first color. Therefore, the pixels included in the flat area AR1 have an identical pixel value, and the pixels included in the flat area AR2 have an identical pixel value as long as noise is not included in the reference image RIM1. However, since noise is included in the reference image RIM1, the pixel values within each flat area are not necessarily identical. In this case, an interpolated image (output image) OIM1 is obtained when the interpolation process is performed on the input image (RAW image) IIM using the guided filter, and the pixel values $q_i$ within the interpolated image (output image) OIM1 are not necessarily identical due to noise. This is because the output pixel values $q_i$ are calculated by multiplying the pixel values $I_i$ of the reference image by a constant, and adding another constant to the resulting value (see the expression (4)).

Figure 8:
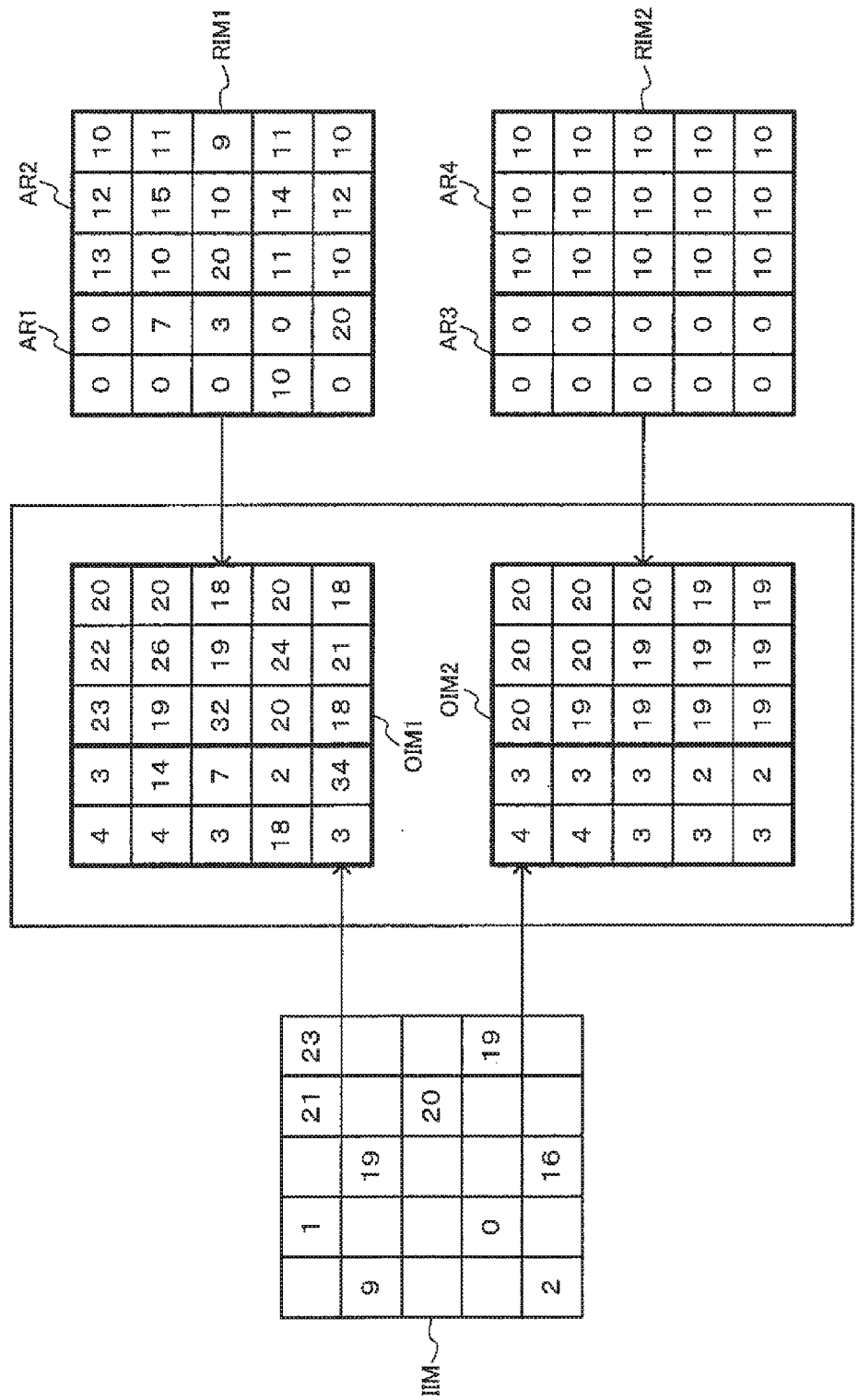
FIG. 8 is a view illustrating a guided filter.

On the other hand, a low-noise reference image RIM2 illustrated in FIG. 8 does not include noise, and the pixel values within each flat area (AR3 and AR4) are identical. In this case, an interpolated image OIM2 in which the pixel values within each flat area (AR3 and AR4) are (almost) identical is output irrespective of the interpolation target input image IIM. Specifically, even when the interpolation target input image includes noise, the interpolated image OIM2 in which noise is reduced can be generated by utilizing the low-noise reference image RIM2 that is reduced in noise.

The above process makes it possible to generate a multi-band image that is reduced in noise while suppressing or reducing an increase in processing load due to the noise reduction process. According to the first embodiment, since the interpolation process is performed on a band basis using the low-noise reference image that is reduced in noise, it is possible to obtain an interpolated i age that is reduced in noise in the same manner as the reference image even when the interpolation process is performed on the band for which the noise reduction process has not been performed, and it is unnecessary to perform the noise reduction process on a band basis. When the noise reduction process is performed on a band basis, a difference in the degree of defocus may occur between the bands in an area that includes a high-frequency component, and an artifact such as a false color may occur. According to the first embodiment, however, since the high-frequency component shares the information about the reference image, it is possible to suppress or reduce the occurrence of a false color.

Although an example in which an identical image (e.g., low-noise reference image RIM illustrated in FIG. 7) is used for each band as the reference image used for the interpolation process performed in the step S105 has been described above, a different reference image may be used on a band basis.

Figure 9:
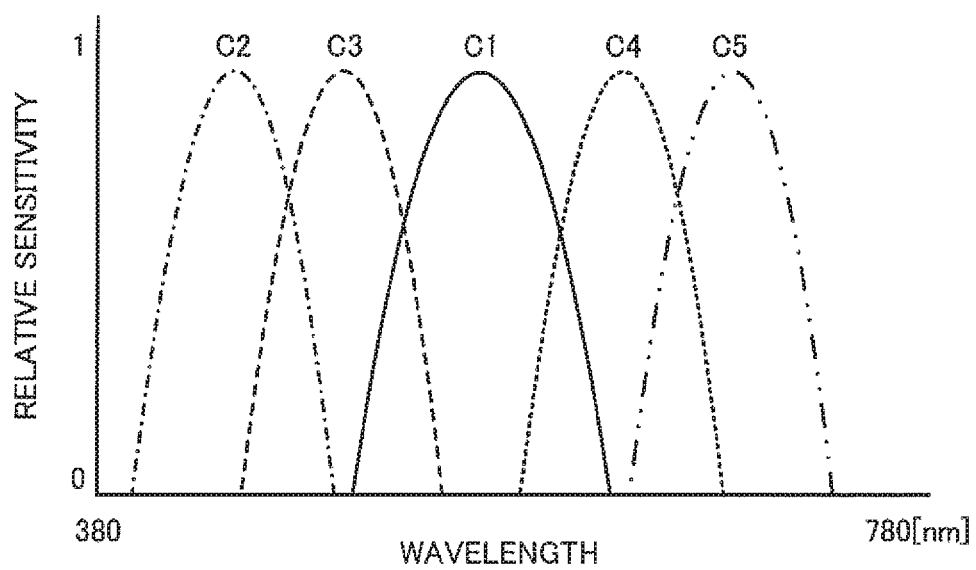
FIG. 9 is a view illustrating spectral sensitivity characteristics.
Figure 10:
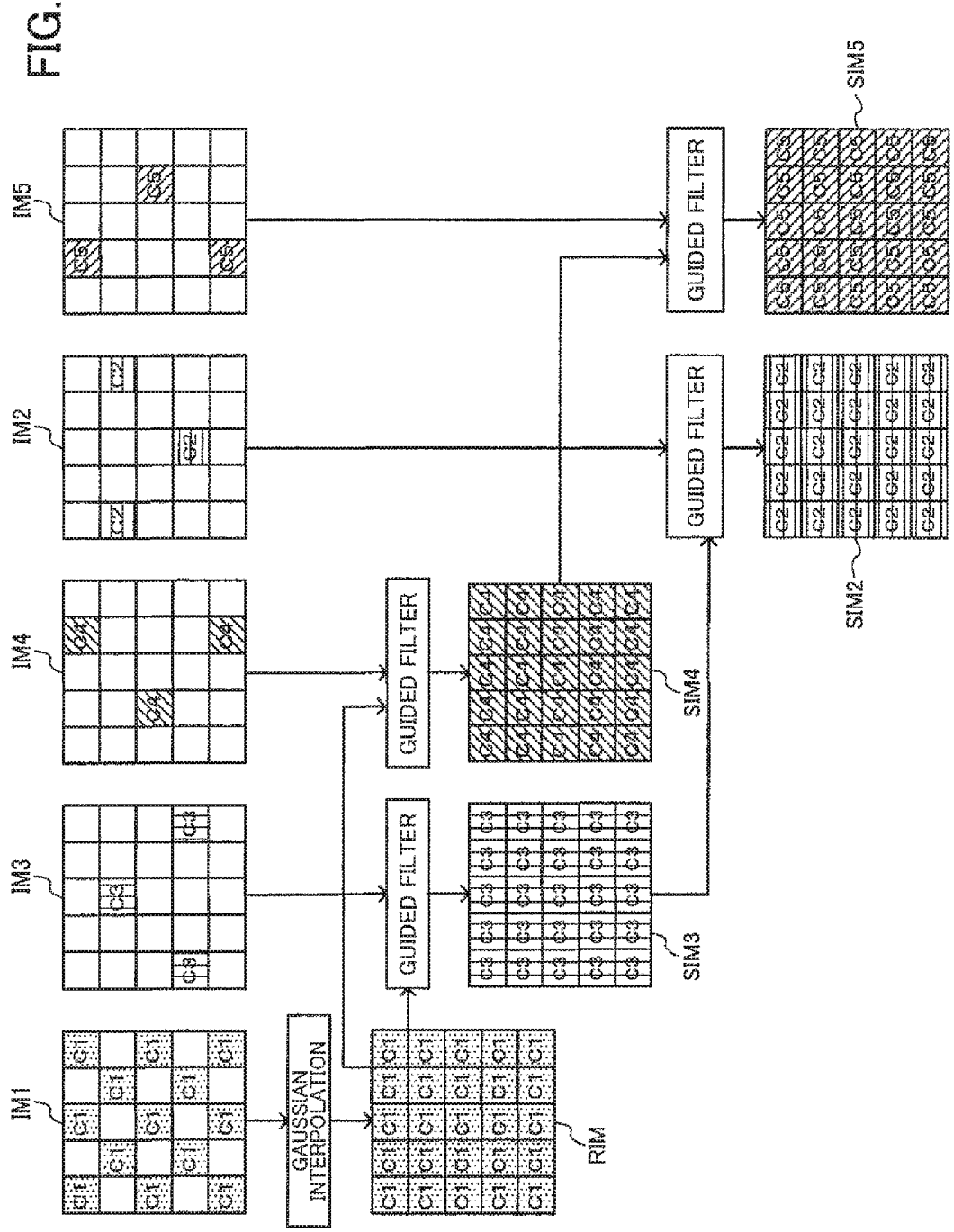
FIG. 10 is a view illustrating another band-basis interpolation process.

A case where a different reference image is used on a band basis is described below taking an example in which a color filter array having the spectral sensitivity characteristics illustrated in FIG. 9 is used. In the graph illustrated in FIG. 9, the horizontal axis indicates wavelength, and the vertical axis indicates relative sensitivity. As illustrated in FIG. 10, the Gaussian interpolation process is performed on an image IM1 obtained by extracting the pixel values that correspond to the C1 band from the RAW image to generate a reference image RIM that corresponds to the C1 band.

The interpolation process is performed on an image IM3 that corresponds to the C3 band and an image IM4 that corresponds to the C4 band that are close to the C1 band as to spectral sensitivity characteristics using the reference image RIM that corresponds to the C1 band to generate an interpolated image SIM3 that corresponds to the C3 band and an interpolated image SIM4 that corresponds to the C4 band.

The interpolation process is performed on an image IM2 that corresponds to the C2 band that is close to the C3 band as to spectral sensitivity characteristics using the interpolated image SIM3 that corresponds to the C3 band to generate an interpolated image SIM2 that corresponds to the C2 band. The interpolation process is performed on an image IM5 that corresponds to the C5 band that is close to the C4 band as to spectral sensitivity characteristics using the interpolated image SIM4 that corresponds to the C4 band to generate an interpolated image SIM5 that corresponds to the C5 band.

As described above, the low-noise reference image generation section 120 may select the first band among the four or more bands as the reference band that corresponds to the reference image, perform the noise reduction process on the pixel values of the captured image that have been obtained using the color filter that corresponds to the first band, and perform the interpolation process on the pixel values that correspond to the first band and have been subjected to the noise reduction process to generate the low-noise reference image. In the example illustrated in FIG. 10, the first band is the C1 band, and the low-noise reference image is the image RIM.

The interpolated image generation section 130 may perform the interpolation process on the pixel values of the captured image that have been obtained using the color filter that corresponds to the second band among the four or more bands based on the low-noise reference image to generate an interpolated image that corresponds to the second band. In the example illustrated in FIG. 10, the C3 band and the C4 band correspond to the second band, and the image SIM3 and the image SIM4 correspond to the interpolated image that corresponds to the second band.

The interpolated image generation section 130 may perform the interpolation process on the pixel values of the captured image that have been obtained using the color filter that corresponds to the third band among the four or more bands based on the interpolated image that corresponds to the second band to generate an interpolated image that corresponds to the third band. In the example illustrated in FIG. 10, the C2 band and the C5 band correspond to the third band, and the image SIM2 and the image SIM5 correspond to the interpolated image that corresponds to the third band.

The reference image can thus be switched corresponding to the spectral sensitivity characteristics, for example. The method that switches the reference image corresponding to the spectral sensitivity characteristics is more effective than the method that uses only the image that corresponds to the C1 band as the reference image when performing the interpolation process on a band basis. Since the interpolation process is performed using the reference image RIM that corresponds to the C1 band that is reduced in noise even when the reference image is switched corresponding to the spectral sensitivity characteristics, the interpolated image SIM3 that corresponds to the C3 band and the interpolated image SIM4 that corresponds to the C4 band are also reduced in noise, and it is possible to generate an interpolated image that corresponds to the C2 band and an interpolated image that corresponds to the C5 band that are also reduced in noise.

Figure 11:
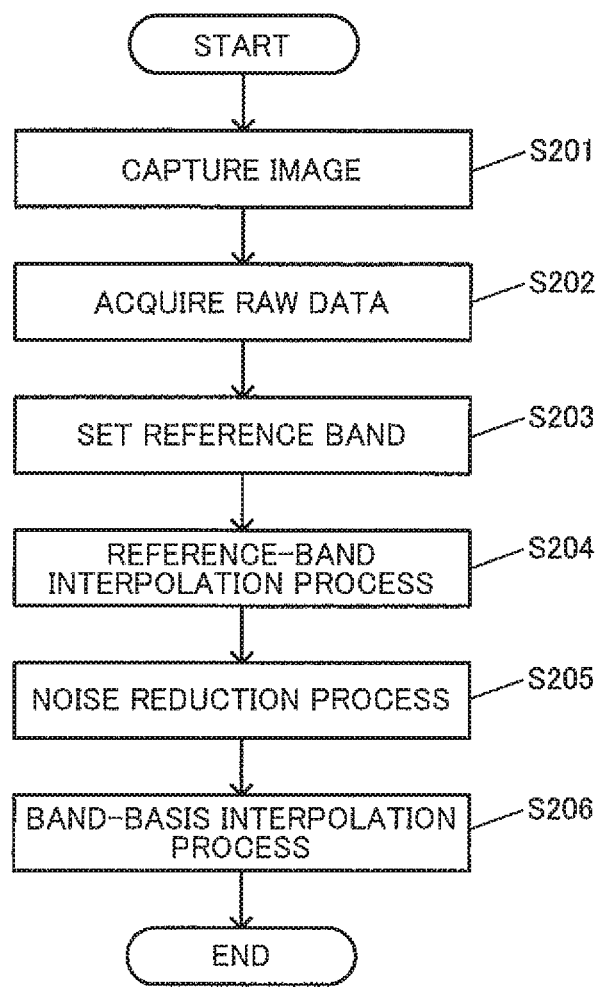
FIG. 11 is a flowchart illustrating the flow of a process according to a modification (first embodiment).

Although a example in which the noise reduction process (S104) performed on the pixel values that correspond to the reference band is performed prior to the interpolation process (S105) performed on the pixels that correspond to the reference band (see the flowchart illustrated in FIG. 4) has been described above, the interpolation process performed on the pixels that correspond to the reference band may be performed prior to the noise reduction process performed on the pixel values that correspond to the reference band (see the flowchart illustrated in FIG. 11).

Specifically, the low-noise reference image generation section 120 may perform the interpolation process on the pixel values of the captured image that have been obtained using the color filter that corresponds to the reference band that corresponds to the reference image (S204), and perform the noise reduction process on the pixel values that correspond to the reference band and have been subjected to the interpolation process (S205) to generate the low-noise reference image. Note that steps S201 to S203 and S206 illustrated in FIG. 11 are respectively the same as the steps S101 to S103 and S106 illustrated in FIG. 4, and description thereof is omitted.

This makes it unnecessary to perform the coordinate transformation process that uses the expression (1), and makes it possible to reduce the amount of noise using a more convenient process, for example. Note that it is possible to generate an interpolated image that is further reduced in noise when the process is performed according to the flowchart illustrated in FIG. 4.

Although an example in which the pixel values that correspond to the band stored in advance are extracted as the pixel values that correspond to the reference band (step S103 illustrated in FIG. 4) has been described above, the reference band may be adaptively selected from the signal (RAW data) obtained from the image sensor 200. It is possible to obtain a more accurate interpolated image by adaptively selecting the reference band.

For example, the low-noise reference image generation section 120 may select a band among the four or more bands that has the highest correlation with the color characteristics of the object captured within the captured image as the reference band that corresponds to the reference image.

More specifically, when the C1 band that has the highest sampling density in the color filter array CFA1 illustrated in FIG. 3A has a low correlation with the color of the object, it is possible to reproduce the high-frequency component by selecting a band among the C2 to C5 bands that has the highest correlation with the color of the object as the reference band. For example, a band that has a high correlation with the color of the object may be selected by selecting a band that includes the largest amount of high-frequency component using a high-pass filter (e.g., Laplacian filter).

This makes it possible to generate an interpolated image that includes a large amount of high-frequency component and has high resolution regardless of the color characteristics of the object, for example.

Note that a method that selects a band that has the highest total brightness value, average brightness value, or the like in the captured image may also be used. Specifically, the low-noise reference image generation section 120 may select the reference band that corresponds to the reference image from the four or more bands by performing an evaluation process on the captured image as to at least one of a high-frequency component and brightness.

This makes it possible to accurately select a band that has a high correlation with the color characteristics of the object, for example.

The reference band that corresponds to the reference image may be selected taking account of the amount of noise or the like. Specifically, the low-noise reference image generation section 120 may select the reference band that corresponds to the reference image from the four or more bands by performing an evaluation process on the captured image as to at least one of the correlation between each band among the four or more bands and the color characteristics of the object captured within the captured image, and the amount of noise that corresponds to each band.

Figure 12:
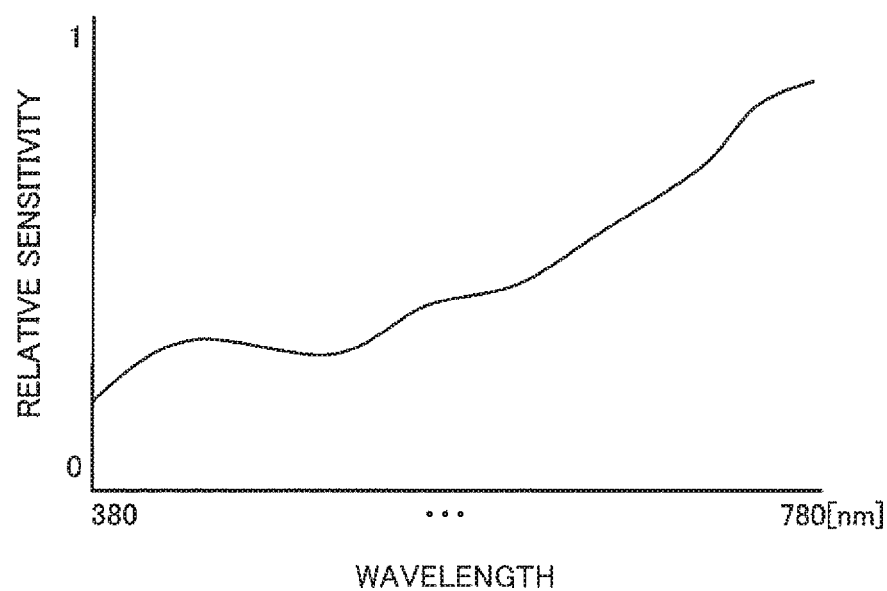
FIG. 12 is another view illustrating spectral sensitivity characteristics.

For example, when the captured image has been captured using illumination light having the spectral sensitivity characteristics illustrated in FIG. 12 (graph), the amount of noise that corresponds to a band (e.g., B band) that has sensitivity on the short wavelength side is amplified due to the white balance correction process that is performed before the captured image is received by the low-noise reference image generation section 120. In this case, both an evaluation value that evaluates the correlation with the color of the object and a noise evaluation value that evaluates the amount of noise are used to select the reference band so that a band other than the B band can be selected as the reference band when the B band has a high correlation with the color of the object. More specifically, a band for which the amount of noise is larger than a threshold value set in advance is not selected as the reference band irrespective of the evaluation value that evaluates the correlation with the color of the object. This makes it possible to select the band that includes the largest amount of high-frequency component as the reference band.

According to this configuration, it is possible to generate an interpolated image that includes a large amount of high-frequency component and has high resolution, even in a scene in which the amount of noise that corresponds to a specific band increases due to the light source used to capture the object, for example.

3. Second Embodiment

A second embodiment illustrates an example in which a band conversion section 140 generates a 3-band image, and the low-noise reference image generation section 120 performs a 3-band image noise reduction process.

Figure 13:
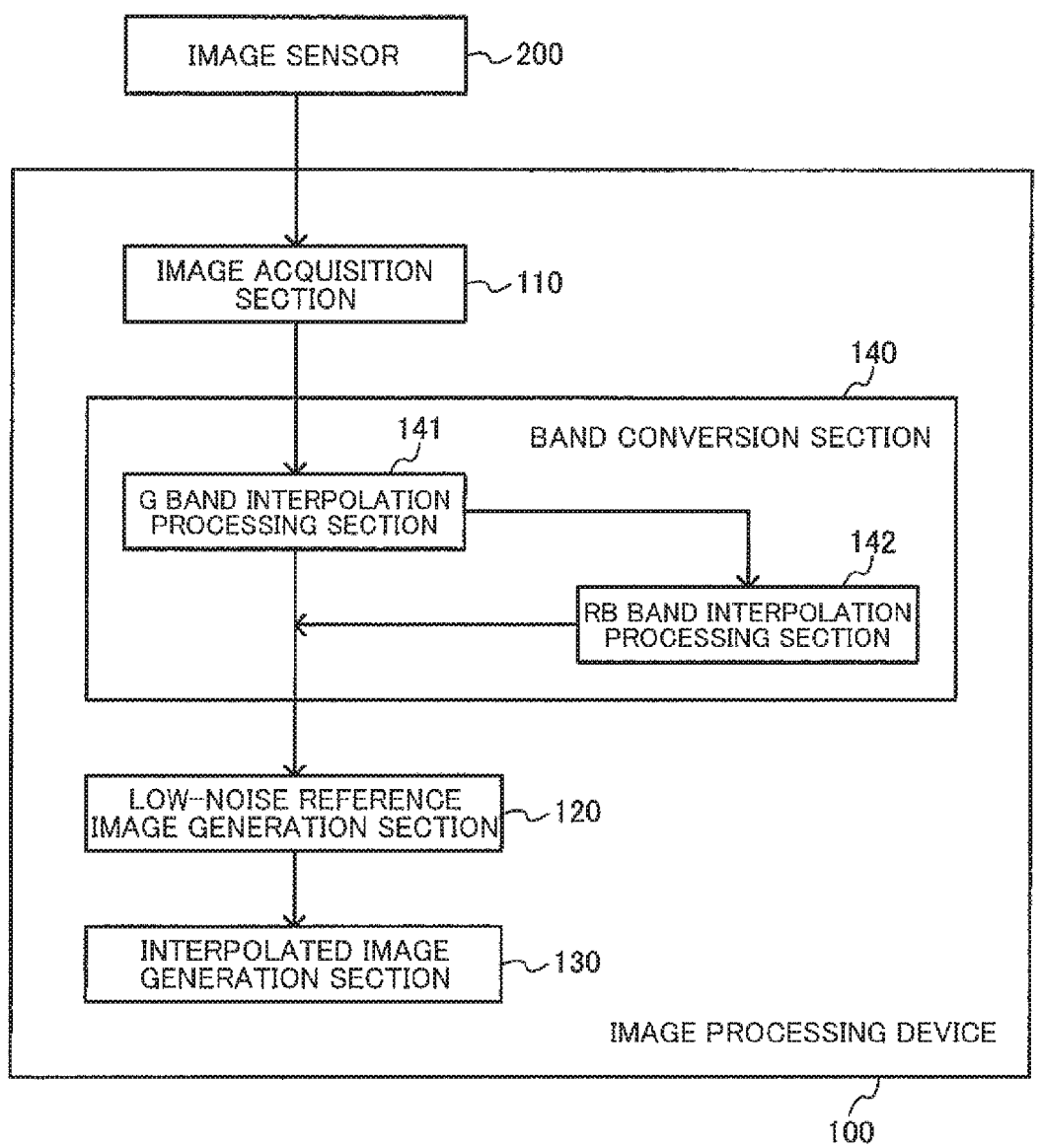
FIG. 13 illustrates a system configuration example (second embodiment).

As illustrated in FIG. 13, the image processing device 100 according to the second embodiment includes the band conversion section 140 in addition to the elements described above in connection with the first embodiment.

The band conversion section 140 performs a band conversion process that converts the pixel values that correspond to at least one band among the four or more bands into the pixel values that correspond to another band that differs in wavelength band from the at least one band.

The low-noise reference image generation section 120 selects a band that is used as the reference band that corresponds to the reference image from the bands obtained through the band conversion process, and performs the noise reduction process on the pixel values that correspond to the reference band obtained through the band conversion process to generate the low-noise reference image.

More specifically, the band conversion section 140 performs the band conversion process based on the captured image to generate an RGB image. The low-noise reference image generation section 120 performs an RGB image noise reduction process as the noise reduction process.

A specific example is described below with reference to FIGS. 13 and 14 and a flowchart illustrated in FIG. 15. As illustrated in FIG. 13, the band conversion section 140 includes a G band interpolation processing section 141 and an RB band interpolation processing section 142.

The image sensor 200 captures an image (S301), and the image acquisition section 110 acquires the RAW data (S302) in the same manner as in the first embodiment. The pixel values that respectively correspond to the R band, the G band, and the B band are extracted from the RAW data (S303). Note that a band that is closest to the R band as to spectral sensitivity characteristics, a band that is closest to the G band as to spectral sensitivity characteristics, and a band that is closest to the B band as to spectral sensitivity characteristics may be stored in the band conversion section 140 in advance, and the pixel values that correspond to a band that is close to the R band as to spectral sensitivity characteristics, the pixel values that correspond to a band that is close to the G band as to spectral sensitivity characteristics, and the pixel values that correspond to a band that is close to the B band as to spectral sensitivity characteristics may be converted into the pixel values that correspond to the R band, the pixel values that correspond to the G band, and the pixel values that correspond to the B band, respectively. For example, when using the 5-band color filter array CFA1 illustrated in FIG. 3A, the pixel values that correspond to the G band are calculated from the pixel values that correspond to the C1 band, the pixel values that correspond to the R band are calculated from the pixel values that correspond to the C5 band, and the pixel values that correspond to the B band are calculated from the pixel values that correspond to the C2 band.

Figure 4:
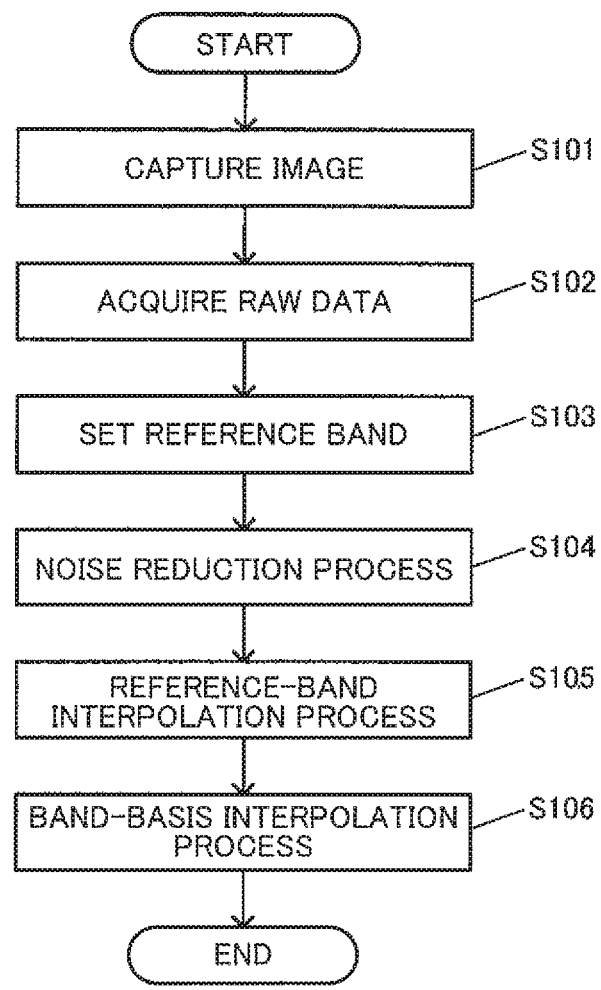
FIG. 4 is a flowchart illustrating the flow of a process (first embodiment).
Figure 14:
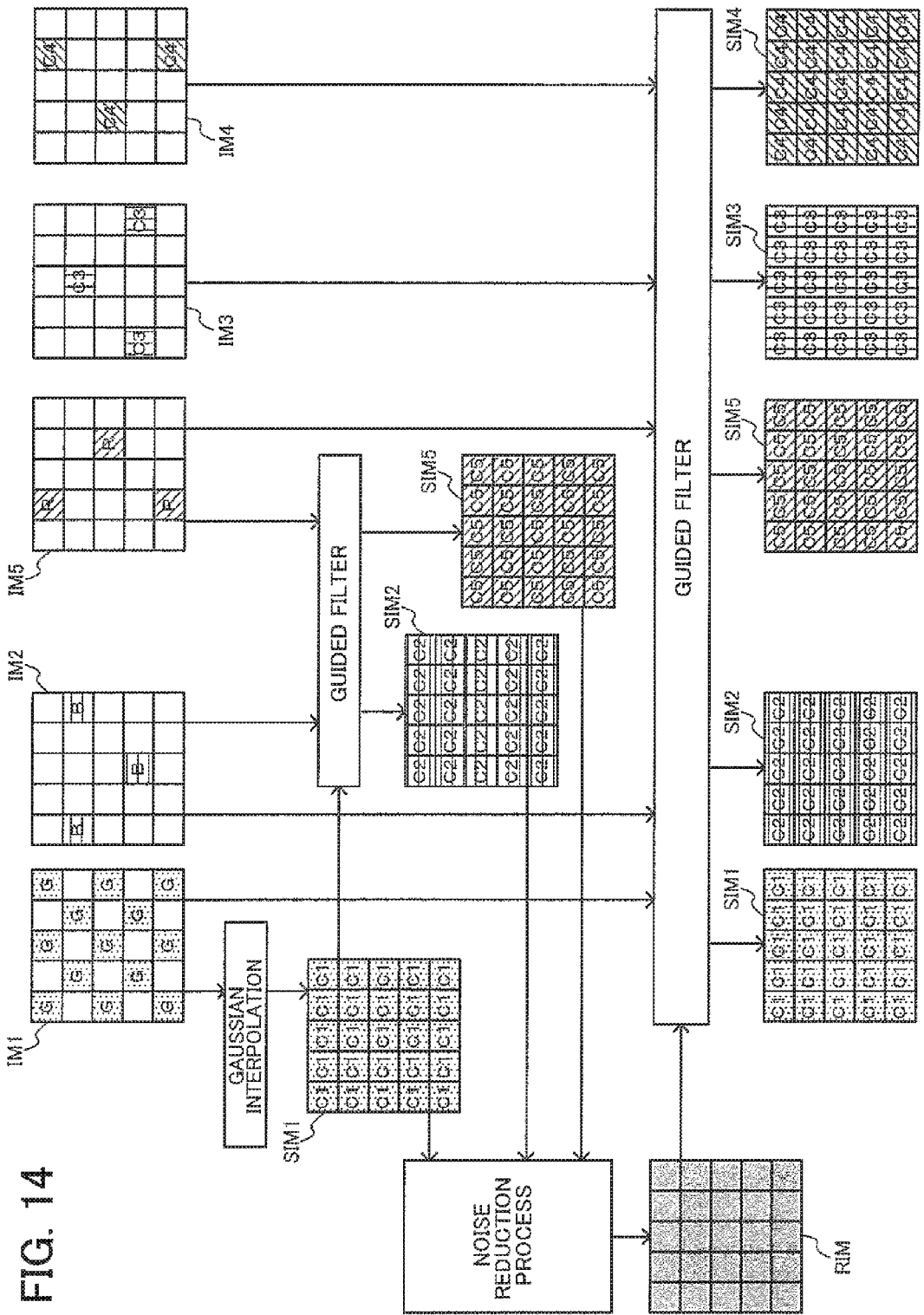
FIG. 14 is a view illustrating an interpolation process (second embodiment).
Figure 15:
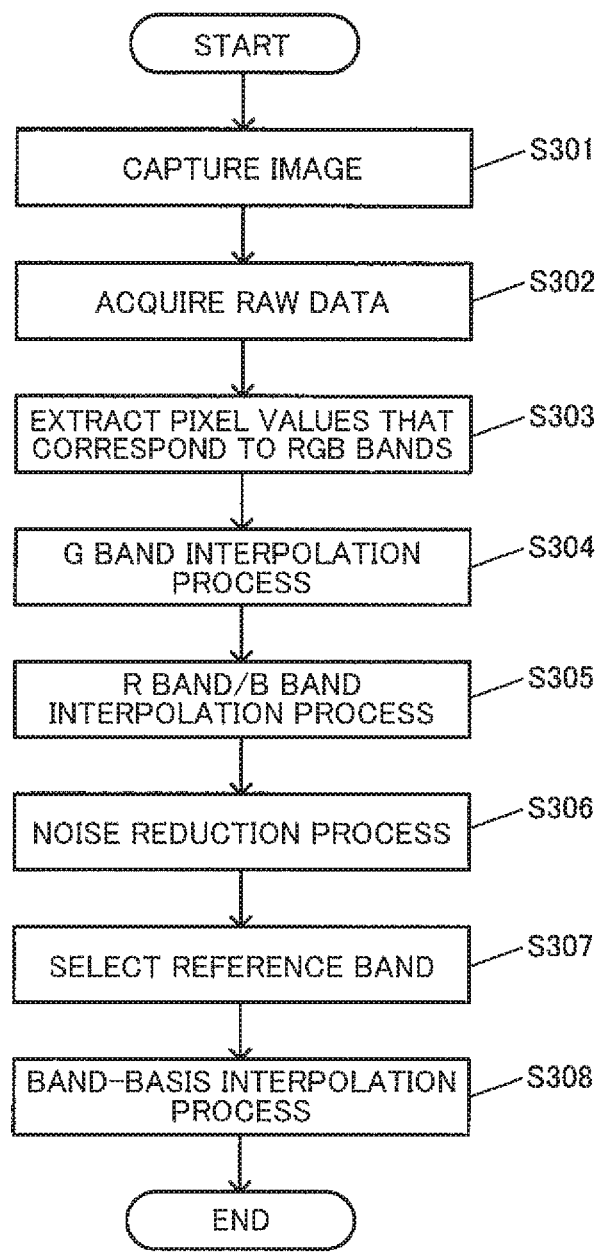
FIG. 15 is a flowchart illustrating the flow of a process (second embodiment).

As illustrated in FIG. 14, the G band interpolation processing section 141 performs the Gaussian interpolation process on the pixel values of the image IM1 that correspond to the G band in the same manner as in the step S105 illustrated in FIG. 4 to generate an interpolated image SIM1 (S304).

The RB band interpolation processing section 142 performs the interpolation process that utilizes the guided filter using the interpolated image SIM1 (that corresponds to the G band) that has been generated by the G band interpolation processing section 141 to generate an interpolated image SIM2 that corresponds to the R band and an interpolated image SIM5 that corresponds to the B band respectively from the image IM2 and the image IM5 (S305). The band conversion section 140 generates an RGB image from these interpolated images (SIM1, SIM2, and SIM5).

The low-noise reference image generation section 120 performs the RGB image noise reduction process using the RGB image generated by the band conversion section 140 (S306). Note that various RGB image noise reduction processes have been proposed (see JP-A-2009-49482, for example), and it is possible to obtain a highly accurate noise reduction effect by utilizing these RGB image noise reduction processes.

The interpolated image generation section 130 selects a band that is used as the reference band from the R band, the G band, and the B band (S307). For example, when the low-noise reference image generation section 120 has performed the noise reduction process using the information about all of the R band, the G band, and the B band, the interpolated image generation section 130 extracts all of the pixel values that correspond to the R band, the pixel values that correspond to the G band, and the pixel values that correspond to the B band as the pixel values that correspond to the reference band.

For example, the interpolation process is performed on the pixels that correspond to the C3 band and the pixels that correspond to the C4 band using the interpolated image that corresponds to the G band that is reduced in noise as the reference image RIM (S308), a multi-band image is generated based on all of the acquired interpolated images (SIM1 to SIM5), and the process is terminated. Note that the interpolation process may also be performed corresponding to all of the C1 to C5 bands in the same manner as described above with reference to FIG. 7.

The band conversion section 140 does not necessarily convert the pixel values of the uninterpolated image into the pixel values that correspond to another band. For example, the RGB image noise reduction process may be performed using the pixels that correspond to a band that is close to the R band, the pixels that correspond to a band that is close to the G band, and the pixels that correspond to a band that is close to the B band as the RGB pixels without performing the band conversion process. For example, when using the 5-band color filter array CFA1 illustrated in FIG. 3A, the pixels that correspond to the C1 band are used as the pixels that correspond to the G band, the pixels that correspond to the C5 band are used as the pixels that correspond to the R band, and the pixels that correspond to the C2 band are used as the pixels that correspond to the B band.

It is also possible to utilize the pixel values that correspond to a band that cannot be acquired directly from the image sensor as the pixel values that correspond to the reference band by performing the band conversion process, for example.

It is also possible to highly accurately reduce noise using the RGB image noise reduction process by generating an RGB image through the band conversion process, for example.

4. Third Embodiment

A third embodiment is described below.

Figure 16:
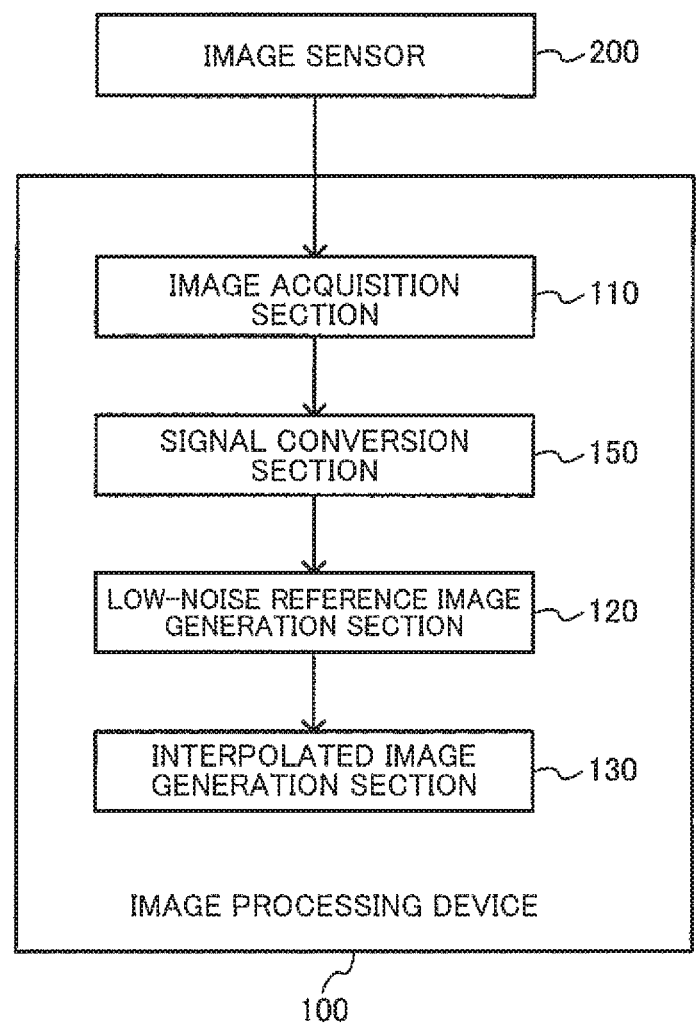
FIG. 16 illustrates a system configuration example (third embodiment).

As illustrated in FIG. 16, the image processing device 100 according to the third embodiment includes a signal conversion section 150 instead of the band conversion section 140 described above in connection with the second embodiment.

The signal conversion section 150 converts each pixel value of the captured image into a brightness signal Y and a color difference signal CbCr.

The low-noise reference image generation section 120 performs a different noise reduction process on the brightness signal Y and the color difference signal CbCr to generate the low-noise reference image.

For example, the low-noise reference image generation section 120 performs a first noise reduction process on the brightness signal Y, and performs a second noise reduction process that is higher in noise reduction effect than the first noise reduction process on the color difference signal CbCr. When using the first noise reduction process and the second noise reduction process, the signal conversion section 150 generates a Y image (brightness image) and a CbCr image (color difference image), and the low-noise reference image generation section 120 extracts the brightness Y and the color difference CbCr as the reference band.

The interpolated image generation section 130 can convert the Y image and the CbCr image that are reduced in noise into an image that corresponds to the G band, and use the resulting image as the reference image. In this case, the low-noise reference image generation section 120 can extract only the brightness Y as the reference band. It is also possible to use the Y image that is reduced in noise as the reference image.

This makes it possible to highly accurately reduce noise using the Y image-CbCr image noise reduction process, for example. It is possible to generate an interpolated image that includes a large amount of high-frequency component and has high resolution regardless of the color characteristics of the object by utilizing the brightness signal as the reference band.

Note that part or most of the process performed by the image processing device, the imaging device, and the like according to the embodiments of the invention may be implemented by a program. In this case, the image processing device, the imaging device, and the like according to the embodiments of the invention are implemented by causing a processor (e.g., CPU) to execute the program. More specifically, a program stored in a non-transitory information storage device is read and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on the program (data) stored in the information storage device. Specifically, a program that causes a computer (i.e., a device that includes an operation section, a processing section, a storage section, and an output section) to function as each section according to the embodiments of the invention (i.e., a program that causes a computer to execute the process implemented by each section according to the embodiments of the invention) is stored in the information storage device.

The image processing device according to the embodiments of the invention may include a memory that stores information (e.g., a program and various types of data), and a processor that operates based on the information stored in the memory. The processor may comprise hardware, the processor being configured to implement: an image acquisition process that acquires a captured image that has been captured using an image sensor, the image sensor including a multi-band color filter array in which color filters that respectively correspond to four or more bands are arranged in an array; a low-noise reference image generation process that generates a low-noise reference image as a reference image that is used for an interpolation process that is performed on pixel values of the captured image, the low-noise reference image having been subjected to a noise reduction process; and an interpolated image generation process that performs the interpolation process on a band basis based on the generated low-noise reference image to generate an interpolated image in which pixel values of missing pixels are interpolated.

The processor may implement the function of each section by individual hardware, or may implement the function of each section by integrated hardware, for example. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an application-specific integrated circuit (ASIC). The memory may be a semiconductor memory (e.g., SRAM or DRAM), a register, a magnetic storage device (e.g., hard disk drive), or an optical storage device (e.g., optical disk device). For example, the memory stores a computer-readable instruction, and each section of the image processing device is implemented by causing the processor to execute the instruction. The instruction may be an instruction included in an instruction set that is included in a program, or may be an instruction that causes a hardware circuit included in the processor to operate.

The operation according to the embodiments of the invention is implemented as described below, for example. The processor acquires a captured image that has been captured using an image sensor that includes a multi-band color filter array in which color filters that respectively correspond to four or more bands are arranged in an array, and stores the captured image in the memory. Note that the memory corresponds to the nonvolatile memory (EEPROM) 214. Note that the captured image may be stored in the memory card 209 (external recording (storage) medium).

The processor generates a low-noise reference image that has been subjected to a noise reduction process as a reference image that is used for an interpolation process that is performed on the pixel values of the captured image, and stores the generated low-noise reference image in the memory.

The processor reads the low-noise reference image from the memory, performs an interpolation process on a band basis based on the low-noise reference image read from the memory to generate an interpolated image in which the pixel values of the missing pixels are interpolated, and stores the generated interpolated image in the memory.

Each section of the image processing device according to the embodiments of the invention is implemented as a module of a program that runs on the processor. For example, the image acquisition section 110 is implemented as an image acquisition module that acquires a captured image that has been captured using an image sensor that includes a multi-band color filter array in which color filters that respectively correspond to four or more bands are arranged in an array, and stores the acquired captured image in the memory. Likewise, the low-noise reference image generation section 120 is implemented as a low-noise reference image generation module that generates a low-noise reference image that has been subjected to a noise reduction process as a reference image that is used for an interpolation process that is performed on the pixel values of the captured image, and stores the generated low-noise reference image in the memory. The interpolated image generation section 130 is implemented as an interpolated image generation module that reads the low-noise reference image from the memory, performs an interpolation process on a band basis based on the low-noise reference image read from the memory to generate an interpolated image in which the pixel values of the missing pixels are interpolated, and stores the generated interpolated image in the memory.

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The configuration and the operation of the image processing device, the imaging device, and the information storage medium are not limited to those described in connection with the above embodiments. Various modifications and variations may be made of the above embodiments.

What is claimed is:

1. An image processing device comprising:
a processor comprising hardware,
the processor being configured to implement:
an image acquisition process that acquires a captured image that has been captured using an image sensor, the image sensor including a multi-band color filter array in which color filters that respectively correspond to four or more bands are arranged in an array;
to a low-noise reference image generation process that generates a low-noise reference image as a reference image that is used for an interpolation process that is performed on pixel values of the captured image, the low-noise reference image having been subjected to a noise reduction process; and
an interpolated image generation process that performs the interpolation process on a band basis based on the generated low-noise reference image to generate an interpolated image in which pixel values of missing pixels are interpolated.

2. The image processing device as defined in claim 1, wherein the processor is configured to implement the low-noise reference image generation process that performs the noise reduction process on the pixel values of the captured image that have been obtained using the color filter that corresponds to a reference band that corresponds to the reference image to generate the low-noise reference image.

3. The image processing device as defined in claim 1, wherein the processor is configured to implement the interpolated image generation process that also calculates a new pixel value based on the low-noise reference image corresponding to pixels of the captured image that have the pixel value to generate the interpolated image.

4. The image processing device as defined in claim 1, wherein the processor is configured to implement the low-noise reference image generation process that selects a first band among the four or more bands as a reference band that corresponds to the reference image, and performs the noise reduction process on the pixel values of the captured image that have been obtained using the color filter that corresponds to the first band to generate the low-noise reference image, and
the processor is configured to implement the interpolated image generation process that performs the interpolation process on the pixel values of the captured image that have been obtained using the color filter that corresponds to a second band among the four or more bands based on the low-noise reference image to generate the interpolated image that corresponds to the second band, and performs the interpolation process on the pixel values of the captured image that have been obtained using the color filter that corresponds to a third band among the four or more bands based on the interpolated image that corresponds to the second band to generate the interpolated image that corresponds to the third band.

5. The image processing device as defined in claim 1, wherein the processor is configured to implement the low-noise reference image generation process that performs a coordinate transformation process that transforms pixel coordinates from a first coordinate system to a second coordinate system on each pixel of the captured image that has been obtained using the color filter that corresponds to the reference band that corresponds to the reference image, performs the noise reduction process on the pixel value of each pixel that corresponds to the reference band that has been subjected to the coordinate transformation process, and performs a coordinate transformation process that transforms the pixel coordinates from the second coordinate system to the first coordinate system on each pixel that has been subjected to the noise reduction process to generate the low-noise reference image.

6. The image processing device as defined in claim 5, wherein the processor is configured to implement the low-noise reference image generation process that performs a coordinate transformation process that rotates the pixel coordinates around an origin by a given angle as the coordinate transformation process that transforms the pixel coordinates from the first coordinate system to the second coordinate system.

7. The image processing device as defined in claim 1, wherein the processor is configured to implement the low-noise reference image generation process that selects a band among the four or more bands that has a highest sampling density as a reference band that corresponds to the reference image.

8. The image processing device as defined in claim 1, wherein the processor is configured to implement the low-noise reference image generation process that selects a band among the four or more bands that has a highest correlation with color characteristics of an object captured within the captured image as a reference band that corresponds to the reference image.

9. The image processing device as defined in claim 1, wherein the processor is configured to implement the low-noise reference image generation process that selects a reference band that corresponds to the reference image from the four or more bands by performing an evaluation process on the captured image as to at least one of a correlation between each band among the four or more bands and color characteristics of an object captured within the captured image, and an amount of noise that corresponds to each band.

10. The image processing device as defined in claim 1, wherein the processor is configured to implement the low-noise reference image generation process that selects a reference band that corresponds to the reference image from the four or more bands by performing an evaluation process on the captured image as to at least one of a high-frequency component and brightness.

11. The image processing device as defined in claim 1,
wherein the processor is configured to implement the
low-noise reference image generation process that performs the interpolation process on the pixel values of the captured image that have been obtained using the color filter that corresponds to a reference band that corresponds to the reference image, and performs the noise reduction process on the pixel values that correspond to the reference band and have been subjected to the interpolation process to generate the low-noise reference image.

12. The image processing device as defined in claim 1,
wherein the processor is configured to implement a band conversion process that converts the pixel values that correspond to at least one band among the four or more bands into the pixel values that correspond to another band that differs in wavelength band from the at least one band, and
the processor is configured to implement the low-noise reference image generation process that selects a band that is used as a reference band that corresponds to the reference image from the bands obtained through the band conversion process, and performs the noise reduction process on the pixel values that correspond to the reference band obtained through the band conversion process to generate the low-noise reference image.

13. The image processing device as defined in claim 12,
wherein the processor is configured to implement the band conversion process that is performed based on the captured image to generate an RGB image, and
the processor is configured to implement the low-noise reference image generation process that performs an RGB image noise reduction process as the noise reduction process.

14. The image processing device as defined in claim 1,
wherein the processor is configured to implement a signal conversion process that converts each pixel value of the captured image into a brightness signal and a color difference signal, and
the processor is configured to implement the low-noise reference image generation process that performs a different noise reduction process on the brightness signal and the color difference signal as the noise reduction process to generate the low-noise reference image.

15. An imaging device comprising the image processing device as defined in claim 1.

16. A non-transitory computer-readable storage device with an executable program stored thereon, wherein the program instructs a microprocessor to perform the following steps of:
an image acquisition process that acquires a captured image that has been captured using an image sensor, the image sensor including a multi-band color filter array in which color filters that respectively correspond to four or more bands are arranged in an array;
a low-noise reference image generation process that generates a low-noise reference image as a reference image that is used for an interpolation process that is performed on pixel values of the captured image, the low-noise reference image having been subjected to a noise reduction process; and
an interpolated image generation process that performs the interpolation process on a band basis based on the generated low-noise reference image to generate an interpolated image in which pixel values of missing pixels are interpolated.

17. An image processing method comprising:
performing an image acquisition process that acquires a captured image that has been captured using an image sensor, the image sensor including a multi-band color filter array in which color filters that respectively correspond to four or more bands are arranged in an array;
performing a low-noise reference image generation process that generates a low-noise reference image as a reference image that is used for an interpolation process that is performed on pixel values of the captured image, the low-noise reference image having been subjected to a noise reduction process; and
performing an interpolated image generation process that performs the interpolation process on a band basis based on the generated low-noise reference image to generate an interpolated image in which pixel values of missing pixels are interpolated.

* * * * *